United States Patent [19]
Varnham et al.

[11] Patent Number: 5,629,472
[45] Date of Patent: May 13, 1997

[54] METHOD OF MINIMIZING BIAS AND ACHIEVING MODE ALIGNMENT BY TRIMMING A VIBRATING RATE SENSOR

[75] Inventors: Malcolm P. Varnham; James McInnes, both of Plymouth, Great Britain

[73] Assignee: British Aerospace Public Limited Company, Hampshire, Great Britain

[21] Appl. No.: 458,186

[22] Filed: Jun. 2, 1995

Related U.S. Application Data

[62] Division of Ser. No. 51,388, Apr. 23, 1993, Pat. No. 5,445,007.

[30] Foreign Application Priority Data

Apr. 24, 1992 [GB] United Kingdom .................. 9208953

[51] Int. Cl.⁶ ................................ G01P 15/125
[52] U.S. Cl. ................ 73/1.37; 73/514.29; 73/1.84; 310/312; 310/321
[58] Field of Search ............... 73/1 DV, 514.29, 73/514.17, 510; 310/316, 329, 321, 312, 369

[56] References Cited

U.S. PATENT DOCUMENTS

| | | | |
|---|---|---|---|
| 5,018,858 | 5/1991 | Malvern | 356/350 |
| 5,098,188 | 3/1992 | Malvern | 356/350 |
| 5,218,867 | 6/1993 | Varnham et al. | 73/514.29 |
| 5,349,261 | 9/1994 | Fujimoto et al. | 310/321 |

FOREIGN PATENT DOCUMENTS

| | | |
|---|---|---|
| 2061502 | 5/1981 | European Pat. Off. . |
| 153189 | 8/1985 | European Pat. Off. . |
| 171378 | 2/1986 | European Pat. Off. . |
| 405152A2 | 1/1991 | European Pat. Off. . |
| 2154739 | 11/1985 | United Kingdom . |

*Primary Examiner*—Hezron E. Williams
*Assistant Examiner*—Helen C. Kwok
*Attorney, Agent, or Firm*—Cushman, Darby & Cushman IP Group of Pillsbury Madison & Sutro LLP

[57] ABSTRACT

A vibrating cylindrical rate sensor (10) is mechanically balanced and mode aligned with respect to the vibrating portion of the sensor (10) by removing material from a vibrating portion of the vibrating cylinder (34) after the drive and pick-off transducers (30, 32, 30a, 18, 20) are fixed to the vibrating portion of the vibrating cylinder (34) of the cylindrical rate sensor (10).

4 Claims, 5 Drawing Sheets

METHOD OF MINIMIZING BIAS AND ACHIEVING MODE ALIGNMENT BY TRIMMING A VIBRATING RATE SENSOR

This is a division of application Ser. No. 08/051,388, filed Apr. 23, 1993, now U.S. Pat. No. 5,445,007.

FIELD OF THE INVENTION

The present invention relates to a method of tuning a vibrating rate sensor and relates particularly, but not exclusively, to a method of balancing and mode alignment of the vibrating portion of a vibrating rate sensor.

DESCRIPTION OF PRIOR ART

FIG. 1 illustrates diagrammatically a single axis rate sensor of the type described in GB 2061502 and GB 2154739. The cylinder of the vibrating rate sensor is driven into resonance by applying an oscillating electronic signal to the drive transducers. The vibration pattern, viewed from the top, of the resonance mode is shown in FIG. 2. It will be seen that there are anti-nodes of maximum radial vibration and nodes of minimal radial vibration present. The primary loop maintains this resonance by ensuring a 90 degree phase shift between the primary drive transducer and primary pick-off transducer.

When the above mentioned rate sensor is rotated, the resonance mode rotates with respect to the cylinder, and a signal can be detected on the secondary pick-off transducer. This signal is amplified and fed back to the secondary drive transducer in order to null it to zero. The strength of this nulling signal is proportional to rotating rate. The signal is demodulated and output as a DC rate signal. It should be noted that the vibration pattern can have a different shape than that shown in FIG. 2. However, the vibration pattern must have nodes and anti-nodes occurring cylindrically around the perimeter of the cylinder. The cylinder does not have to be driven exactly at 50 resonance—but in practice it is desirable so to do. The resonant body neither has to be circular, nor cylindrical. Hemispheres and rings can be used. However, it is desirable that the oscillating modes seen by primary and secondary electronic circuits (referred to as the primary and secondary resonance) have the same, or nearly the same resonant frequency.

GB 2061502 describes a metal cylinder, closed at one end and supporting by a stem, which is driven into resonance using piezo-electric elements stuck onto the metal cylinder as shown in FIG. 3. Piezo-electric elements are also used to pick-off the movement.

GB 2154739 describes a similar device of unitary construction made from piezo-electric material where the drive and pick-off pieces are formed by polarizing the material between electrode regions as shown in FIG. 4.

GB 2061502 illustrates in FIG. 3 of that reference that, because of the difficulty of mounting a secondary pick-off transducer exactly at a nodal position, it is more convenient to provide a pair of secondary pick-off transducers with their two outputs combined together in such a manner as to provide a zero output in the absence of the rotation. Two secondary drive transducers are then required opposite the pair of secondary pick-off transducers. The outputs of the secondary pick-off transducers are adjusted to give maximum rejection of the applied radial vibration. Then the signals applied to the secondary drive transducers are adjusted.

GB 2154739 illustrates that the device described in GB 2061502 can be made entirely from a unitary piece of piezo-electric material, and that the transducing action of electrical input to the mechanical output can be made to take place within the resonator itself.

One of the problems associated with the above two described sensors is that it is difficult to machine piezo-electric cylinders accurately such that the primary and secondary modes of vibration have identical resonant frequencies. If the true modes of vibration are not aligned to the ideal positions of the drive and pick-off transducers, this leads to bias signals being present. Thus, the secondary pick-off transducers will in general see an output even when no rotation rate is applied. This is the case even when the transducers have been positioned accurately with respect to the ideal position. The arrangement shown in GB 2061502 is disadvantageous in that it is difficult to achieve the desired performance targets with the disclosed structure.

Another drawback of the arrangement given in GB 2061502 is that it is not efficient in the number of bond wires and/or transducing elements. Thus one more bond wire is required in the secondary pick-off transducer and one more in the secondary drive transducer.

One of the disadvantages of GB 2154739 is that it is difficult to machine cylinders accurately enough and it is not possible to position electrodes accurately enough to achieve the performance required for many practical applications.

There therefore exists a requirement for a method of increasing the performance capabilities of a vibrating rate sensor.

The present invention overcomes the problems associated with the above mentioned prior rate sensors by providing a method of mechanically balancing the cylinder by the removal of material, and then trimming the effective electrode positions to minimize bias.

The present invention is applicable to both the devices described in the above mentioned patents, together with other similar rotation rate sensors based on resonating hemispheres, cylinders, and rings.

SUMMARY OF THE INVENTION

Accordingly, the present invention provides a method of mechanically balancing the vibration portion of a vibrating rate sensor of the type having primary and secondary drive transducers, and primary and secondary pick-off transducers, the method including the following steps;

(a) applying a sinusoidal signal to the primary drive, (b) adjusting the frequency of the signal until a desired vibration mode is excited and the phase of the primary pick-off is at 90 degrees with respect to the primary drive, (c) measuring the primary vibratory mode frequency ($f_{np}$)

(d) repeating steps (a) and (b) for the secondary drive, (e) measuring the frequency of the secondary vibratory mode ($f_{ns}$)

(f) removing a small amount of material from a portion of the vibrating portion adjacent either the drive or the pick-off which corresponds to the mode having the lowest resonant frequency so as to reduce the frequency difference to within a desired amount so as to mechanically balance the vibrating portion.

It will be appreciated that by balancing the vibrating portion after it has been machined and after the electrodes have been positioned thereon, it will be possible to balance the vibrating portion without having to accurately machine it or accurately position electrodes thereon.

Preferably the method includes the step of repeating steps (a) to (f) iteratively until the frequency difference is within a desired amount.

A second embodiment of the present invention discloses a method of minimizing bias and achieving mode alignment by trimming the effective transducer position of a vibrating rate sensor of the type having primary and second drive transducers and primary and secondary pick-off transducers the method including the following steps;

(a) applying a sinusoidal signal to the primary drive, (b) adjusting the frequency of the signal until a desired vibration mode is excited and the phase of the primary pick-off is at 90 degrees with respect to the primary drive, (c) measuring the primary vibratory mode frequency ($f_{np}$), (d) repeating steps (a) and (b) for the secondary drive, (e) measuring the frequency of the secondary vibratory mode ($f_{ns}$), (f) monitoring the output of the secondary pick-off, (g) removing material from the vibrating portion at a position between the electrodes until the secondary signal component which is in phase with respect to the primary pick-off is zero so as to trim the effective electrode position to minimise bias.

Advantageously material is removed from a position clockwise with respect to the primary drive electrode if the in-phase component of the secondary pick-off is in anti-phase with respect to the in-phase signal of the primary pick off, and from a position anti-clockwise with respect to the primary drive electrode if the in phase component of the secondary pick-off signal and the signal of the primary pick-off are in positive phase.

Preferably the above described method is repeated until the in-phase component of the secondary pick-off signal with respect to the in-phase component of the primary pick-off signal is less than a given amount ideally zero ration.

A vibrating rate sensor when tuned in accordance with one or the other of the above described methods is also considered to be novel.

A vibrating rate sensor suitable for being tuned in accordance with one or both of the above mentioned methods may comprise primary drive transducers split asymmetrically on one side of a vibrating portion thereof and complete on another side thereof.

Alternatively, the primary drive transducers may be split symmetrically on one side of the vibrating portion thereof and complete on another side thereof.

In a further alternative arrangement, the primary drive electrodes may be complete on both sides of a vibrating portion thereof but angularly displaced so as to facilitate swinging of the effective electrode position on either side of a mean position.

DESCRIPTION OF THE DRAWINGS

The present invention will now be more particularly described by way of example only with reference to the following drawings in which.

DETAILED DESCRIPTION OF THE PRESENT INVENTION

Figure 1:
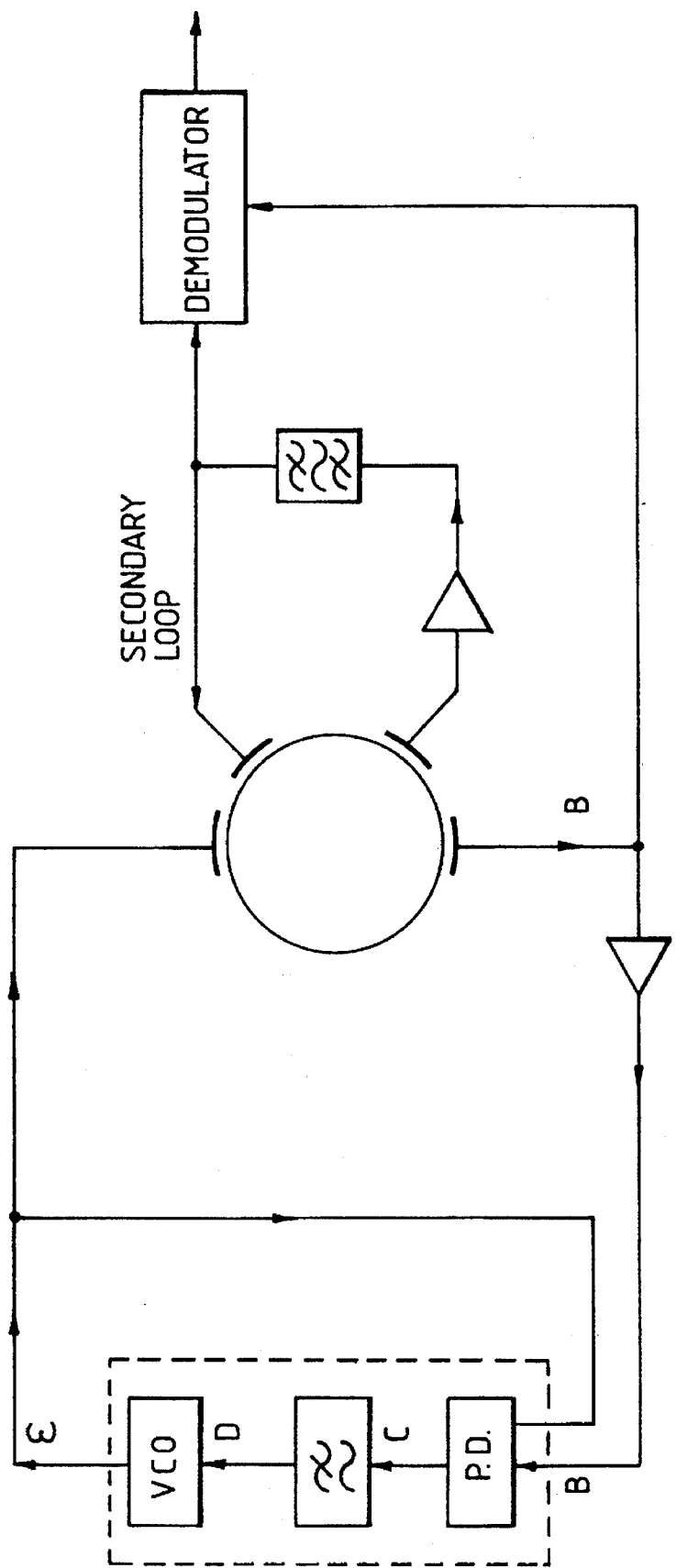
FIG. 1 is a schematic diagram of a single axis rate sensor of the type described in GB 2061502 and GB 2154739.
Figure 2:
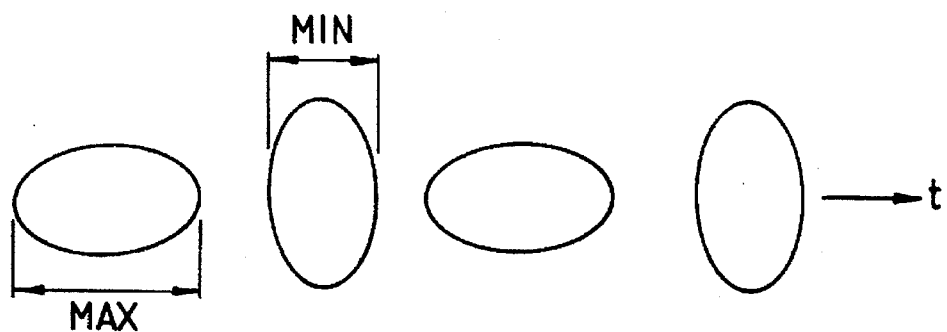
FIG. 2 is a diagrammatic representation of the vibration pattern produced in the vibrating cylinder of a single axis rate sensor.
Figure 3:
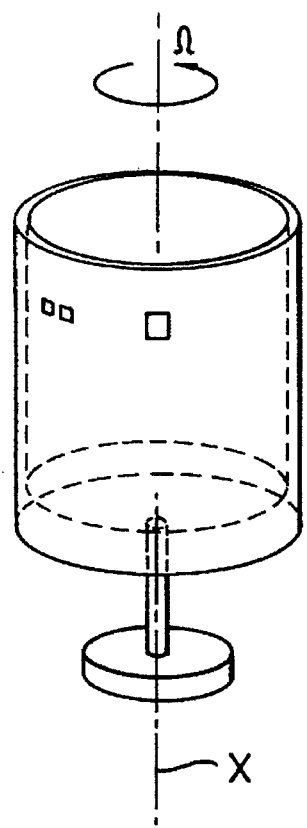
FIG. 3 is a perspective view of a vibrating cylinder structure for inclusion in a typical vibrating rate sensor.
Figure 4:
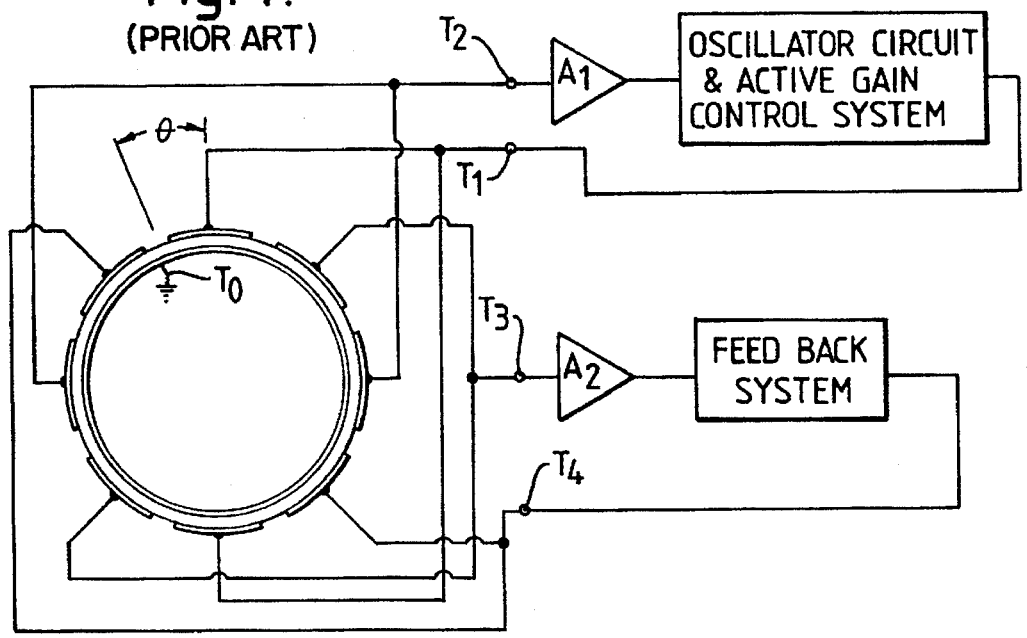
FIG. 4 illustrates a device similar to that shown in FIG. 1 but of unitary construction made from piezo-electric material where the drive and pick-off transducers are formed by polarizing the material between electrode regions.
Figure 5:
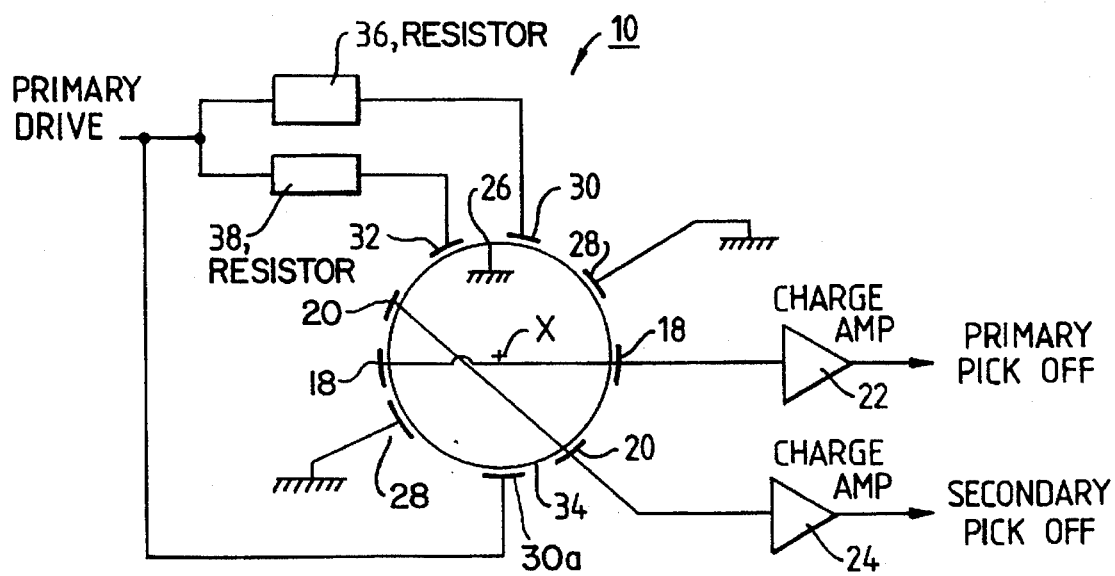
FIG. 5 is a schematic representation of a vibratory rate sensor capable of being tuned in accordance with the present invention.
Figure 6:
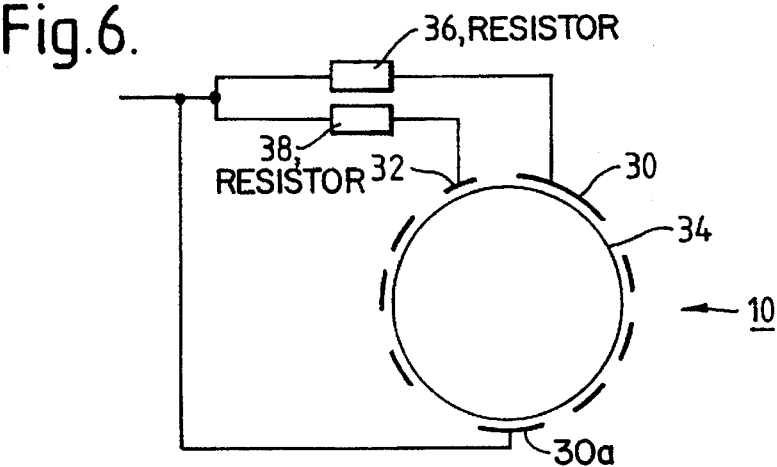
FIGS. 6 to 8 illustrate in more detail alternate electrode positions on the cylinder shown in FIG. 5, and FIGS. 9A to 9C illustrate the removal of a small amount of material from a portion of the vibrating cylinder.
Figure 7:
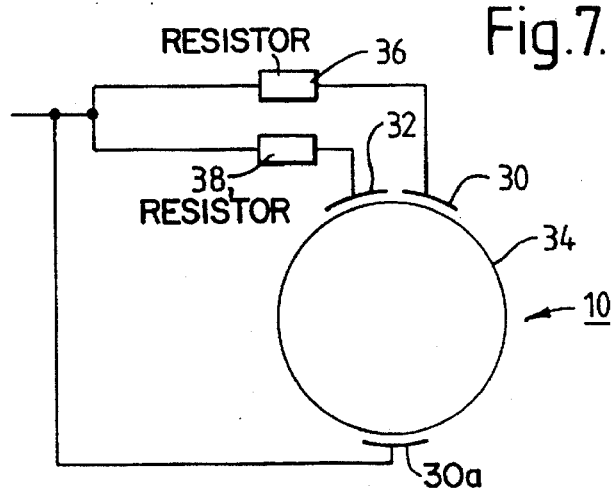
Figure 8:
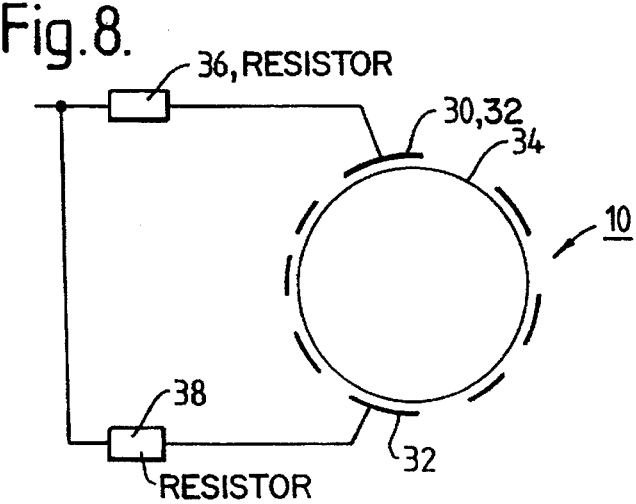
Figure 9A:
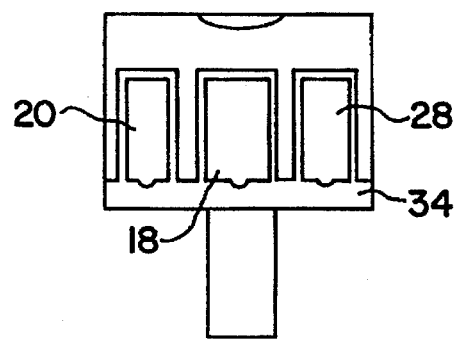
Figure 9B:
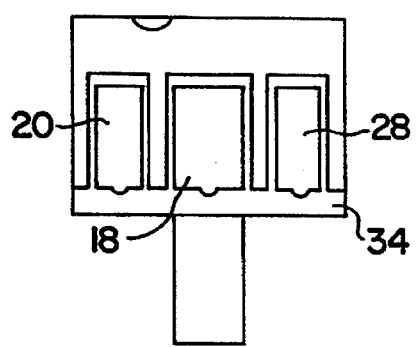
Figure 9C:
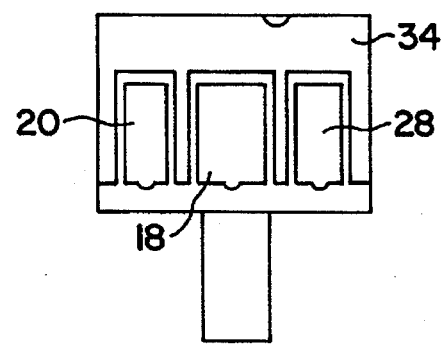

Referring now to the drawings in general but particularly to FIG. 5 which illustrates a vibrating rate sensor of the type shown in FIG. 1 and described above, but having the additional features of the primary and secondary pick-off transducers 18, 20 being connected to charge amplifiers 22, 24 and the inner electrode 26 and the secondary drive electrodes 28, are connected to earth. As in GB 2154739 the primary pick-off electrodes 18 are connected together, as are the secondary pick-off electrodes 20. The primary drive electrodes 30, 32 are split on one side of the vibrating cylinder 34 only, and connected together via a resistor network 36, 38. FIGS. 6 to 8 illustrate a number of alternative split drive electrode positions.

In order to mechanically balance the vibrating portion of the vibrating cylinders. 34 of the vibrating rate sensor 10, the following steps are undertaken.

(Step A) A sinusoidal signal is applied to the primary drive transducers 30, 32 through resistors 36, 38, respectfully;

(Step B) The frequency of the sinusoidal signal is adjusted until a desired vibration mode is excited and the phase detected by of the primary pick-off transducers 18 is at 90 degrees with respect to the sinusoidal applied to the transducers 30,; 32 primary drive;

(Step C) The frequency ($f_{np}$) of the primary vibratory mode is measured;

(Step D) Steps A and B are repeated for the secondary drive electrodes 28;

(Step E) The frequency of the secondary vibratory mode ($f_{ns}$) is measured;

(Step F) A small amount of material is removed from a portion of the vibrating cylinder 34 adjacent either the drive or the pick-off tranducers of whichever mode corresponds to the mode having the lowest resonant frequency so as to reduce the frequency difference to within a desired amount.

Steps A to F may be repeated iteratively until the frequency difference is within a particularly desired amount ideally zero. The frequency of a mode is altered by filing material above an electrode relating to that mode. This has the effect of reducing mass in motion in the vibration (modal mass) and since the resonant frequency f is related to the mass by: $f = 1/\sqrt{M}$, the resonant frequency is increased.

A second embodiment of the present invention discloses a method of minimizing bias and achieving mode alignment by trimming the effective electrode position, the method including exciting the primary mode as outlined in steps A to E above and monitoring the output of the secondary pick-off transducer on, for example, an oscilloscope (not shown). Material is then removed from the top rim between the electrodes until the secondary signal component in phase with respect to the primary pick-off is zero. In other words, until the secondary pick-off signal is 90 degrees out of the phase with respect to the primary pick-off signal.

Material is removed clockwise with respect to the primary drive electrode if the out from the secondary pick-off transducers 20 are less than 90 degrees out of phase with respect to the output from the primary pick-off tranducers 18, and at a position anti-clockwise with respect to the primary drive electrode if the signals are greater than 90 degrees out of phase. The detail of which direction with respect to the primary drive electrode material should be removed depends upon the relative dispositions of the primary pick-off and secondary pick-off electrodes. The process is iterated until the in-phase component of the output signal of the secondary pick-off transducer 20 with respect to the output signal of the primary pick-off transducer 18 is less than a given amount (typically 0.01).

If desired, the above mentioned steps may be repeated to improve the accuracy of the tuning process. It should be noted that in practice it is difficult (or time consuming) to reduce the component of the output signal of the secondary pick-off transducers 20 which is in quadrature with respect to the output signal of the primary pick-off transducers 18, to zero by material removal.

FIGS. 6 to 8 illustrate different arrangements for the vibrating electrode configuration on the cylinder 34. FIG. 6 illustrates the primary drive electrodes 30, 32 split asymmetrically on one side of the vibrating cylinder 34, but complete on the other as shown by 30a. FIG. 7 illustrates the primary drive electrodes 30, 32 split symmetrically on one side of the cylinder, but complete on the other as shown by 30a. FIG. 8 illustrates the primary drive electrodes 30, 32 complete on both sides of the vibrating cylinder 34. However these electrodes 30, 32 are angularly displaced such that by varying the electrical drive to the electrodes 30, 32, it is possible to swing the effective electrode position either side of a mean position.

Irrespective of which arrangement is used, the quadrature component of the output signal of the secondary pick-off electrodes 20 with respect to the output signal of the primary pick-off electrode 18 can be reduced to zero. The split and asymmetrical electrode patterns shown in FIG. 6 to 8 are more efficient in terms of bond wires and electrodes than the equivalent scheme given in GB 2154739.

We claim:

1. A method of minimizing bias and achieving mode alignment by trimming an effective transducer position of a vibrating rate sensor made of piezoelectric material of a type having a vibrating portion, a primary drive transducer, a secondary drive transducer, a primary pick-off transducer, and a secondary pick-off transducer, said method including steps of:

(a) applying a sinusoidal signal to said primary drive transducer;

(b) adjusting a frequency of said sinusoidal signal applied to said primary drive transducer until a desired first vibration mode is excited in said vibrating portion and a phase of a signal from said primary pick-off transducer is at 90 degrees with respect to a phase of said sinusoidal signal applied to said primary drive transducer;

(c) measuring said signal from said primary pick-off transducer as a primary vibratory mode frequency ($f_{np}$);

(d) applying a sinusoidal signal to said secondary drive transducer;

(e) adjusting a frequency of said sinusoidal signal applied to said secondary drive transducer until a desired second vibration mode is excited in said vibrating portion and a phase of a signal from said secondary pick-off transducer is at 90 degrees with respect to a phase of said sinusoidal signal applied to said secondary drive transducer;

(f) measuring said signal from said secondary pick-off transducer as a secondary vibratory mode frequency ($f_{ns}$);

(g) ensuring that a modal frequency split between said primary vibratory mode frequency and said secondary vibratory mode frequency is less than a given value which is less than said primary vibratory mode divided by 2Q;

(i) removing material from said vibrating portion at a position between said primary drive transducer and said secondary drive transducer until a component of said signal from said secondary pick-off transducer is in quadrature with respect to said signal from said primary pick-off transducer is zero.

2. A method as claimed in claim 1, wherein said material is removed from said vibrating portion at one of:

a position clockwise with respect to said primary drive transducer if said signal from said secondary pick-off transducer is in antiphase with respect to said signal from said primary pick-off transducer; and a position anticlockwise with respect to said primary drive transducer if said signal from said secondary pick-off transducer is in phase with said signal from said primary pick-off transducer.

3. A method as claimed in claim 1, wherein:

said method is repeated until quadrature component of said signal from said secondary pick-off transducer with respect to said signal from said primary pick-off transducer is less than a given ratio.

4. A mode aligned vibrating cylindrical rate sensor comprising:

a vibrating cylinder comprised of piezoelectric material;

a plurality of separate electrodes formed on an outer surface of said vibrating cylinder at spaced intervals, said separate electrodes and said piezoelectric material of said vibrating cylinder forming a respective plurality of separate transducers; and an amount of said piezoelectric material being removed from a rim of said vibrating cylinder at a position between two adjacent ones of said plurality of separate transducers so as to minimize bias and achieve mode alignment of said vibrating cylinder.

* * * * *